United States Patent [19]

Abbott

[11] 4,276,623

[45] Jun. 30, 1981

[54] UNDERWATER AUDIO INTERCOMMUNICATION SYSTEM

[76] Inventor: Frank R. Abbott, 3953 Wildwood, San Diego, Calif. 92107

[21] Appl. No.: 86,188

[22] Filed: Oct. 17, 1979

[51] Int. Cl.³ .............................................. H04B 11/00
[52] U.S. Cl. ................................................ 367/132
[58] Field of Search ......................................... 367/132

[56] References Cited
U.S. PATENT DOCUMENTS 3,150,345  9/1964  Freeman ............................... 367/132

*Primary Examiner*—Richard A. Farley

[57] ABSTRACT

Audio communications between divers or between a diver and a surface craft are made without unduly burdening the divers. Diver carried throat microphones pass vocal signals to a preamplifier-amplifier package. The package drives a transducer which projects amplified vocal signals that are capable of being heard by the other diver or feeds signals to a surface power supply pack and a speaker while a surface microphone enables communications from the surface to the divers. The divers don't carry any additional electronics instrumentations and, since there is no signal heterodyning, distortion is reduced.

6 Claims, 1 Drawing Figure

UNDERWATER AUDIO INTERCOMMUNICATION SYSTEM

BACKGROUND OF THE INVENTION

Most underwater communication systems between divers rely on ultrasonic carriers which necessitate a demodulator carried by each diver. Since most underwater tasks require a diver's full attention to operate bulky, awkward implements under unfavorable conditions, a demodulator package could get in the way and, in some instances, create a hazard or otherwise compromise a diver's effectiveness.

A "Sonic Communication System" disclosed in U.S. Pat. No. 3,150,345 by J. E. Freeman, selectively transmits and receives audio information in a body of water. His system provides for underwater and above surface use and has a capability for selectively connecting an audio frequency input source to a loudspeaker, transducer or combination of the two. While the system represents a meritorious advance in the state-of-the art, it appears to be limited in that it is not adaptable for use by several divers and a surface station and may add unneeded equipment when arduous undersea tasks are performed.

An electroacoustic transducer developed by Ralph Weinger and disclosed in U.S. Pat. No. 2,937,244 attempts to give a diver a communication capability without duly burdening him. The Weinger pressure compensating technique employs a bladder interconnected transducer to reduce the problems associated with distortion or loading of the transducer diaphragm. The purpose of the pressure compensation system of Weinger is to improve the operation of the "System And Method For Underwater Communication" disclosed by D. R. Kursman et al., in U.S. Pat. No. 2,798,902. In the Kursman et al., communication system, electrical energy patterns are modified into different electrical signal patterns in accordance with a selected function to render it most effective for underwater transmission. Kursman et al., recognized that distortion problems may be prevalent with signal modification techniques, for example, heterodyning, and they sought to improve the transducer's operational characteristics. However, signal modification techniques necessarily calls for electronics to be carried by a diver which might interfere with the job at hand.

Thus, there is a continuing need in the state-of-the art for an underwater communication system which reliably permits acoustic communications between divers and their surface support vessel while not overly burdening the divers with unnecessary instrumentation packages.

SUMMARY OF THE INVENTION

The present invention is directed to providing a system for enabling audio communications between divers and a surface support vessel. Throat microphones carried by each diver convert vocal signals into representative electrical signal which are fed to a central common preamplifier-amplifier stage. From the preamplifier-amplifier stage, the vocal signals are fed to a transducer which projects the signals throughout the water medium. Simultaneously, the vocal signals are transmitted to the surface vessel by a communication link to allow bidirectional communications with the surface vessel. A power pack on the vessel energizes the preamplifier-amplifier stage and thus removes it from the immediate work site.

A prime object of the invention is to assure more reliable underwater communications.

Yet another object is to provide a system for allowing communications between divers and a surface support vessel.

Still another object of the invention is to provide a system which does not unduly burden a diver with instrumentation packages.

Still another object of the invention is to provide an underwater communication system free of undersea demodulators so that real time vocal communications among several divers are assured.

Another object of the invention is to provide an underwater communication system having a preamplifier-amplifier stage and power pack stage removed from a diver's work site.

Still another object is to provide an underwater communication system which projects vocal signals from one source throughout a predetermined volume.

These and other objects of the invention will become more readily apparent from the ensuing specification and the claims when taken with the accompanying drawing.

BRIEF DESCRIPTION OF THE DRAWING

The drawing illustrates in schematic form the salient features of the invention.

BRIEF DESCRIPTION OF THE PREFERRED EMBODIMENT

Figure 1:
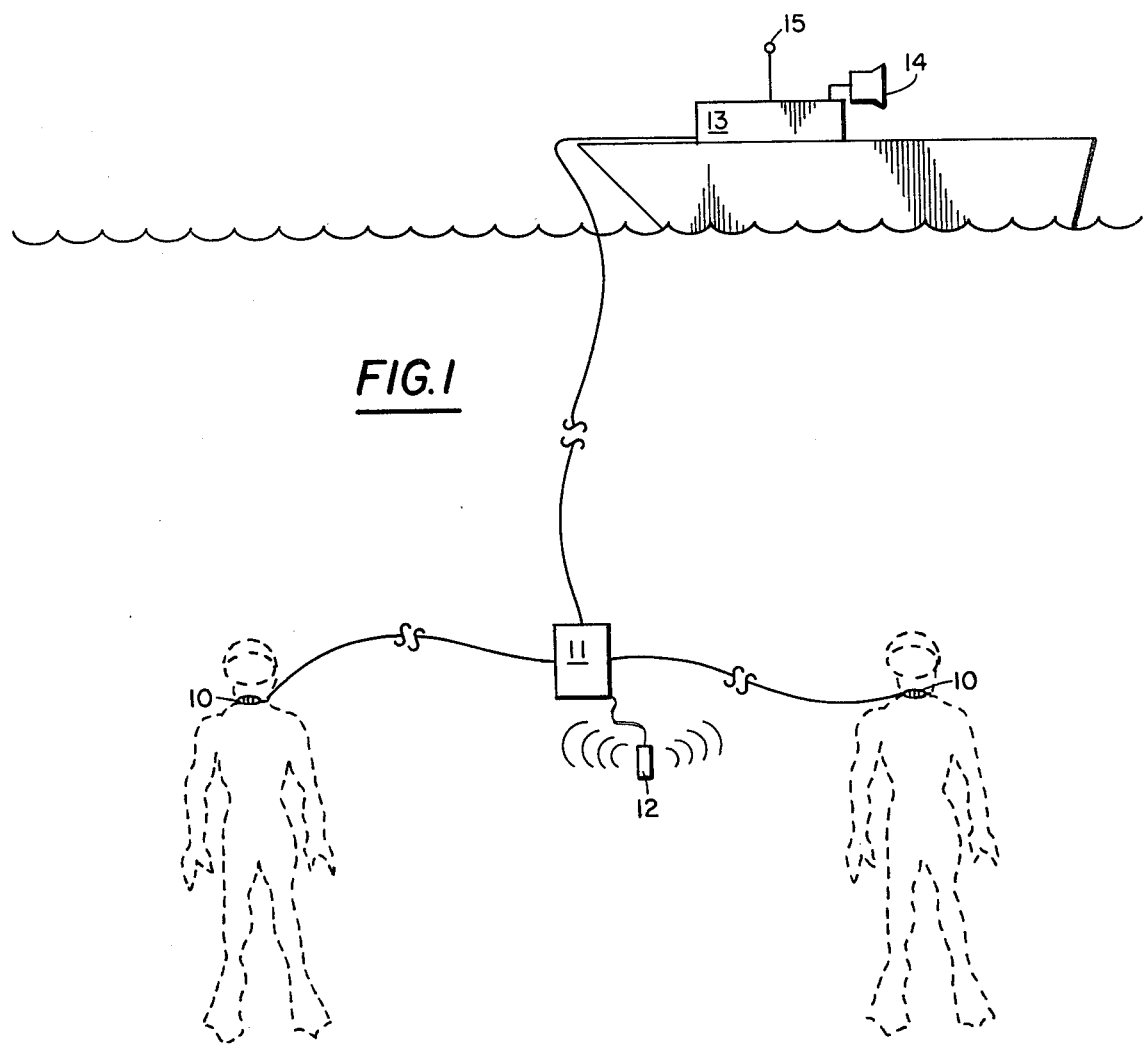

Referring now to the drawing the underwater communication system allows communications among several divers and a surface support vessel. Such real time communications are essential to reduce the hazards associated with many tasks performed under adverse conditions. Currents, surge, limited visibility as well as the awkward tools and implements make the need for reliable communications of utmost importance.

A throat microphone 10 is carried beneath each diver's chin for the purpose of converting the vocal sounds into responsive electric signals. Any one of a number of commercially available microphones could be used and a microphone of the type described in U.S. Pat. No. 3,718,897 issued to Frank R. Abbott and entitled "High Fidelity Underwater Music Projector" could be selected. This device is capable of being operated in the active or passive mode and when operated in the passave mode and reduced in size would make an ideal microphone for this application.

The representative signals are fed to a preamplifier-amplifier stage 11 via a suitable conductor. The preamplifier-amplifier stage functions to take the representative signals from each of the divers and appropriately amplify them in accordance with well proven techniques. Next, the project amplified acoustic signals are projected throughout the water medium by a projector transducer 12. The projector transducer could be a larger model of the projector referred to in the U.S. Pat. No. 3,718,897 and would be driven at a sufficient level to assure that 500 to 2000 hertz signals representative of human speech would travel through the water to, say, a distance of 2000 meters and thereby provide for reliable communications between divers.

Note that there are no encumbering instrumentation packages carried by the divers which might interfere with their work. Because many strenuous tasks are performed by tethered divers, the conductors reaching from each diver to the preamplifier-amplifier stage would impose no burden for, in all practicality, the conductors would be taped onto the breathing mixture line that extends from a central distribution point.

A combination, power and information transfer conductor, extends from the preamplifier-amplifier stage to a power supply pack 13 on the surface support vessel. Thus, the inherent hazards that go along with placing a power pack beneath the water's surface are largely avoided with this arrangement and communications between the divers can be monitored via a surface speaker 14.

The capability for communicating from the surface support vessel to the divers is provided by including a microphone 15 in electrical communication with the preamplifier-amplifier stage. Bidirectional communications between the boat and divers are thereby assured.

It is realized that the throat microphones employed by the divers do not give the best fidelity. However, under the circumstances, the level of intelligibility is sufficient to permit meaningful exchanges in the harsh working environment.

From the foregoing, it is apparent that divers are not overly encumbered by additional instrumentation while working. No instrumentation or accessory packages associated with the communications link are carried by the divers other than the throat microphones. Continuous real time contact with the support vessel is maintained. The entire communication system is easily retrieved at the close of an operation. The possibility of injury due to exposure to the power pack is avoided.

Obviously, many other modifications and variations of the present invention are possible in the light of the above teachings. It is therefore to be understood that within the scope of the appended claims the invention may be practiced otherwise than as specifically described.

I claim:

1. A system for audio communication among divers and a surface support vessel comprising:

means carried by each diver for converting vocal signals into representative electrical signals;

means disposed remotely from the divers and coupled to receive the representative electrical signals for providing amplified signals;

means connected to the amplified signal providing means for projecting amplified vocal signals to impinge on the divers to asure their hearing the vocal signals;

means interconnecting the amplified signal providing means and the surface support vessel for electrically linking therewith; and means mounted on the surface support vessel and connected to the electrically linking means for enabling vocal transmissions.

2. A system according to claim 1 in which each converting means is a throat microphone only.

3. A system according to claim 2 in which the amplified vocal signal projecting means is an acoustic projector transducer.

4. A system according to claim 3 in which the amplified signal providing means is a preamplifier-amplifier stage.

5. A system according to claim 4 in which the electrically linking means is communication line.

6. A system according to claim 6 in which the vocal transmission enabling means includes a power supply for the preamplifier-amplifier stage and a microphone-speaker.

* * * * *